(12) United States Patent
Williams et al.

(10) Patent No.: US 8,150,023 B2
(45) Date of Patent: Apr. 3, 2012

(54) AUTOMATED SYSTEM AND METHOD FOR DISTINGUISHING AUDIO SIGNALS RECEIVED IN RESPONSE TO PLACING AND OUTBOUND CALL

(75) Inventors: Mark Williams, North Canton, OH (US); Jeremy Starcher, Cuyahoga Falls, OH (US)

(73) Assignee: Virtual Hold Technology, LLC, Akron, OH (US)

( * ) Notice: Subject to any disclaimer, the term of this patent is extended or adjusted under 35 U.S.C. 154(b) by 1824 days.

(21) Appl. No.: 11/246,409

(22) Filed: Oct. 7, 2005

(65) Prior Publication Data
US 2007/0116208 A1    May 24, 2007

(51) Int. Cl.
*H04M 3/00*    (2006.01)
(52) U.S. Cl. .......... 379/266.08; 379/373.04; 379/374.01
(58) Field of Classification Search ............... 379/88.01, 379/88.03, 114.13, 265.01–266.08
See application file for complete search history.

(56) References Cited

U.S. PATENT DOCUMENTS

| | | | |
|---|---|---|---|
| 5,134,651 A * | 7/1992 | Ortiz et al. | 379/144.08 |
| 5,371,787 A * | 12/1994 | Hamilton | 379/386 |
| 5,430,792 A | 7/1995 | Jesurum et al. | |
| 5,506,898 A | 4/1996 | Costantini et al. | |
| 5,581,602 A | 12/1996 | Szlam et al. | |
| 5,627,884 A | 5/1997 | Williams et al. | |
| 5,644,625 A * | 7/1997 | Solot | 379/88.22 |
| 5,724,420 A | 3/1998 | Torgrim | |
| 5,796,791 A * | 8/1998 | Polcyn | 379/265.09 |
| 5,799,077 A * | 8/1998 | Yoshii | 379/266.07 |
| 5,828,731 A | 10/1998 | Szlam et al. | |
| 5,828,781 A | 10/1998 | Szalm et al. | |
| 6,041,116 A | 3/2000 | Meyers | |
| 6,058,180 A * | 5/2000 | Young | 379/234 |
| 6,208,970 B1 * | 3/2001 | Ramanan | 704/270 |

(Continued)

FOREIGN PATENT DOCUMENTS
EP    1 478 167    11/2004

OTHER PUBLICATIONS
International Search Report for corresponding International Application No. PCT/US08/67080, dated Oct. 6, 2008.

(Continued)

*Primary Examiner* — Simon Sing
(74) *Attorney, Agent, or Firm* — Renner, Otto, Boisselle & Sklar, LLP

(57) ABSTRACT

A system directs action based on distinguishing audio content received in response to placing an outbound call. The system comprises an audio signal analysis system and an audio content analysis system. The audio signal analysis system directs a portion of an audio signal that comprises audio content to the audio content analysis system. The audio content analysis system: i) receives portions of the audio signal comprising audio content; and ii) directs handling of the outbound call in response to detecting a characteristic of the audio content. The audio content system: i) directs a first handling of the outbound call in response to identifying a first characteristic of the audio content; and ii) directs a second handling of the outbound call in response to identifying a second characteristic of the audio content. The first handling of the outbound call may be directed in response to identifying a characteristic of the audio content associated with recorded content and the second handling of the outbound call is directed in response to identifying a characteristic of the audio content associated with real time spoken audio.

23 Claims, 3 Drawing Sheets

U.S. PATENT DOCUMENTS

| | | | |
|---|---|---|---|
| 6,278,777 B1 | 8/2001 | Morley et al. | |
| 6,546,097 B1 | 4/2003 | Peltz | |
| 6,549,621 B1* | 4/2003 | Christie et al. | 379/230 |
| 6,563,921 B1 | 5/2003 | Williams et al. | |
| 6,584,191 B1 | 6/2003 | McPartlan et al. | |
| 6,694,009 B1 | 2/2004 | Anderson et al. | |
| 6,728,363 B2 | 4/2004 | Lieberman et al. | |
| 6,731,725 B1* | 5/2004 | Merwin et al. | 379/88.23 |
| 6,741,689 B2 | 5/2004 | Burg | |
| 6,744,881 B1* | 6/2004 | Price | 379/308 |
| 6,748,060 B2 | 6/2004 | Lee et al. | |
| 6,754,332 B1 | 6/2004 | Kneipp et al. | |
| 6,754,334 B2 | 6/2004 | Williams et al. | |
| 6,766,013 B2 | 7/2004 | Flockhart et al. | |
| 6,829,331 B2 | 12/2004 | Cullis | |
| 6,850,602 B1* | 2/2005 | Chou | 379/80 |
| 6,985,559 B2* | 1/2006 | Hardy | 379/1.02 |
| 6,990,179 B2* | 1/2006 | Merrow et al. | 379/69 |
| 6,999,565 B1* | 2/2006 | Delaney et al. | 379/88.13 |
| 7,006,608 B2* | 2/2006 | Seelig et al. | 379/88.22 |
| 7,043,006 B1* | 5/2006 | Chambers et al. | 379/265.02 |
| 7,171,245 B2* | 1/2007 | Chen et al. | 455/570 |
| 7,174,011 B2 | 2/2007 | Kortum et al. | |
| 2003/0083875 A1 | 5/2003 | Brown et al. | |
| 2004/0002865 A1 | 1/2004 | Chan et al. | |
| 2004/0170258 A1* | 9/2004 | Levin et al. | 379/88.01 |
| 2005/0129217 A1 | 6/2005 | McPartlan et al. | |
| 2006/0256949 A1 | 11/2006 | Noble | |

OTHER PUBLICATIONS

Written Opinion for corresponding International Application No. PCT/US08/67080, dated Oct. 6, 2008.

International Search Report for corresponding International Application No. PCT/US08/075541, dated Feb. 26, 2009.

Written Opinion for for corresponding International Application No. PCT/US08/075541, dated Feb. 26, 2009.

U.S. Appl. No. 11/820,253, filed Jun. 19, 2007, for Accessory Queue Management System and Method for Interacting With a Queuing System.

U.S. Appl. No. 11/901,186, filed Sep. 14, 2007, for Expected Wait Time System With Dynamic Array.

U.S. Appl. No. 11/143,857, filed Jun. 2, 2005, for Expected Wait Time Augmentation System and Method.

U.S. Appl. No. 11/206,723, filed Aug. 18, 2005, for Resource Based Queue Management System and Method.

European Search Report for corresponding European Application No. 06816246.0, dated Apr. 7, 2009.

Levitt, Harry, Noise Reduciton in Hearing Aids, Journal of Rehabilitation Research and Development, vol. 38, No. 1, Jan. 2001.

Borne, Steven, Ringback Tones, Wireless Business and Technology, Oct. 6, 2004.

Rednova, Globe Telecom's Ringback Tone Service Surpasses 100,000 Subscriber in the First Week of Launch, Apr. 27, 2004.

Sunmicrosystems, Ringback Tones help Carrier's Dial Up New Profits, Boardroom Minutes, Aug. 2004.

Graham, Jefferson, Cell phone users provide muscial interlude for callers, USA Today, Dec. 7, 2004.

Das et al, "Application of automatic speech recognition in call classification" in proceedings of IEEE International Conference on Acoustics, May 2002.

* cited by examiner

Figure 2

| Characteristic 42 | Associated Characteristic 44 |
|---|---|
| Repetitive Measure | Recorded Content |
| Extraneous Intensity / Frequency Spectrum | Recorded Content |
| Continuous S.S.I.F.S. | Recorded Content |
| Repetative S.S.I.F.S. | Real Time Spoken Audio |
| Discontinuous / in Intensity / Frequency Spectrum | Answer Event |

42a — Repetitive Measure
42b — Extraneous Intensity / Frequency Spectrum
42c — Continuous S.S.I.F.S.
42d — Repetative S.S.I.F.S.
42e — Discontinuous / in Intensity / Frequency Spectrum 44a, 44b — Recorded Content
44c — Answer Event

Figure 3

| Event Parameter 46 | Direction Output 28 |
|---|---|
| Binary Busy Cadence | Busy State |
| Audio Content (Recorded Content) Before Binary Ring Back Cadence | Maintain Ring Back State |
| Binary Ring Back Cadence Followed by Audio Content (Recorded Content) | Answered by Machine State |
| Off Hook Transition Click Followed by Audio Content (Recorded Content) | |
| Audio Content (Real Time Spoken Audio) | Answered by Person State |
| Audio Conent Followed by Audio Below Silence Threshold Followed by Audio Content | |

46a — Binary Busy Cadence
46b — Audio Content (Recorded Content) Before Binary Ring Back Cadence
46c — Binary Ring Back Cadence Followed by Audio Content (Recorded Content)
46d — Off Hook Transition Click Followed by Audio Content (Recorded Content)
46e — Audio Content (Real Time Spoken Audio)
46f — Audio Conent Followed by Audio Below Silence Threshold Followed by Audio Content 28a — Busy State
28b — Maintain Ring Back State
28c — Answered by Machine State
28d — Answered by Person State

AUTOMATED SYSTEM AND METHOD FOR DISTINGUISHING AUDIO SIGNALS RECEIVED IN RESPONSE TO PLACING AND OUTBOUND CALL

TECHNICAL FIELD

The present invention relates to distinguishing audio signals received in response to placing an outbound call and, more particularly, to an automated system and method for analyzing the audio signal and taking one of a plurality of actions based on a characteristic of the audio signal.

BACKGROUND OF THE INVENTION

Automated dialing systems are often used to place telephone calls and then connect the called party to a resource only after the called party has answered the telephone. An advantage of using an automated dialing system is that the resource is not expended manually dialing the call and waiting for the called party to answer the telephone. Further, if the line is busy or the called party does not answer the telephone after a predetermined number of rings—no resource time is expended on the unanswered call.

One problem with automated dialing systems is that if an answering machine answers the call, the resource may be connected to the answering machine rather than the called party.

To alleviate this problem, several systems have been developed for detecting whether a call has been answered by an answering machine or a person. For example, U.S. Pat. No. 5,371,787 to Hamilton uses a combination of a click detector, a ring detector, a voice detector, click analyzer, ring analyzer, noise analyzer, answer analyzer, silence analyzer, and voice analyzer to distinguish whether a telephone was answered by an answering machine based on time intervals of voice and silence within the audio signal.

Each of U.S. Pat. No. 5,430,792 to Jesurum et al., U.S. Pat. No. 5,724,420 to Torgrim, and U.S. Pat. No. 5,828,731 to Szlam et al. similarly distinguishes between the existence of voice and silence within the audio signal to determine whether the telephone has been answered by an answering machine.

In a separate field of technology, traditional ring back (e.g. a cadence of 2 seconds on, 4 seconds off in the US) is being replaced by customized ring back audio content. For example, the audio content can be any recorded audio such as a spoken message, music, a performed audio monolog (such as comedy), or other recorded audible sound.

A problem exists in that the known technology for distinguishing between whether a telephone has been answered by a machine or a person uses detecting the presence of (or detecting of the discontinuity of) transitions in the audio signal between: i) "ring" and "silence" in traditional ring back cadence, ii) clicks, iii) voice, and iv) silence to both distinguish when a telephone is answered and whether the telephone was answered by a person or a machine.

Replacing the traditional ring back cadence with audio content eliminates an easily detectible sequence of events within the audio signal (the transitions between ring and silence) that is used by traditional systems to: i) detect answering of the telephone; and ii) initiate the measurement of time elapsing between the audio discontinuities of voice and silence used as input for the algorithms for determining whether the call was answered by a person or an answering machine.

In one aspect of the present invention, what is needed is a system and method for distinguishing audio signals received in response to placing an outbound call and, more particularly, to an automated system and method for analyzing audio content (as opposed to discontinuities in the audio signal) and taking one of a plurality of actions based on a characteristic or set of characteristics of the audio signal.

In another aspect of the present invention, what is needed is a system and method for detecting when an outbound telephone call has been answered in response to placing an outbound call that does not rely on detecting traditional ring back cadence.

In yet another aspect of the present invention, what is needed is a system and method for detecting whether an outbound telephone call has been answered in a network lacking traditional ring back cadence and, if answered, whether such outbound call has been answered by a person or an answering machine.

SUMMARY OF THE INVENTION

A first aspect of the present invention comprises an action direction system for directing action based on distinguishing audio content received in response to placing an outbound call.

The system comprises an audio signal analysis system and an audio content analysis system. The audio signal analysis system directs a portion of an audio signal that comprises audio content to the audio content analysis system.

The audio content analysis system: i) receives portions of the audio signal comprising audio content; and ii) directs handling of the outbound call in response to detecting a characteristic of the audio content.

The audio content analysis system: i) directs a first handling of the outbound call in response to identifying a first characteristic of the audio content; and ii) directs a second handling of the outbound call in response to identifying a second characteristic of the audio content.

The first handling of the outbound call may be directed in response to identifying a characteristic of the audio content associated with recorded content and the second handling of the outbound call may be directed in response to identifying a characteristic of the audio content associated with real time spoken audio.

The characteristic of the audio content that is associated with recorded audio content may be a repetitive measure (such as music) or the characteristic of the audio content that is associated with recorded audio may be an extraneous intensity/frequency spectrum pattern (e.g. outside a recognizable voice intensity/frequency spectrum pattern).

A handling system may direct handling of the outbound call in response to a combination of signal direction provided by the audio signal analysis system and a content direction provided by the audio content analysis system.

The signal direction provided by the audio signal analyses system may identify a portion of the audio signal representing audio content and a portion of the audio signal representing events from a group of signal events consisting of: i) binary ring cadence; ii) binary busy cadence; iii) an "off hook" transition click; and iv) audio below a silence threshold.

The content direction provided by the audio content analysis identifies a characteristic of the audio content.

The handling system may: i) direct a first handling of the outbound call in response to the content direction identifying a first characteristic of the audio content; and ii) direct a second handling of the outbound call in response to the content direction identifying a second characteristic of the audio content.

More specifically, the handling system may: i) direct handling of the outbound call as unanswered in a ring back state in response to identifying a characteristic of the audio content associated with recorded content before the audio signal analysis system identifies a portion of the audio signal consisting of binary ring cadence; ii) direct handling of the outbound call as answered by a messaging machine in response to identifying a characteristic of the audio content associated with recorded content after the audio signal analysis system identifies a portion of the audio signal consisting of binary ring cadence or an "off hook" transition click; and iii) direct handling of the outbound call answered by a person in response to identifying a characteristic of the audio content associated with real time spoken audio.

Again, the characteristic of the audio content that is associated with recorded audio content may be a repetitive measure (such as music) or the characteristic of the audio content that is associated with recorded audio may be an extraneous intensity/frequency spectrum pattern (e.g. outside a recognizable voice intensity/frequency spectrum pattern).

A second aspect of the present invention comprises a system for detecting audio content ring back in response to placing an outbound call. The system comprises an audio signal analysis system and an audio content analysis system.

The audio signal analysis system directs a portion of an audio signal that comprises audio content to an audio content analysis system in response to detecting such audio content before detecting a portion of an audio signal that comprises binary ring back cadence.

The audio content analysis system: i) receives portions of the audio signal comprising audio content; and ii) identifies the portion of the audio signal comprising audio content as audio content ring back if a characteristic of the audio content is associated with recorded audio content.

Again, the characteristic of the audio content that is associated with recorded audio content may be a repetitive measure (such as music) or the characteristic of the audio content that is associated with recorded audio may be an extraneous intensity/frequency spectrum pattern (e.g. outside a recognizable voice intensity/frequency spectrum pattern).

For a better understanding of the present invention, together with other and further aspects thereof, reference is made to the following description, taken in conjunction with the accompanying drawings. The scope of the present invention is set forth in the appended claims.

BRIEF DESCRIPTION OF THE DRAWINGS

FIG. 2 is a table representing exemplary audio content characteristics and associated secondary characteristics in accordance with one embodiment of the present invention;

FIG. 3 is a table representing exemplary event parameters in the context of placing an outbound call and a direction output associated therewith in accordance with one embodiment of the present invention.

DETAILED DESCRIPTION OF THE EXEMPLARY EMBODIMENTS

Figure 1:
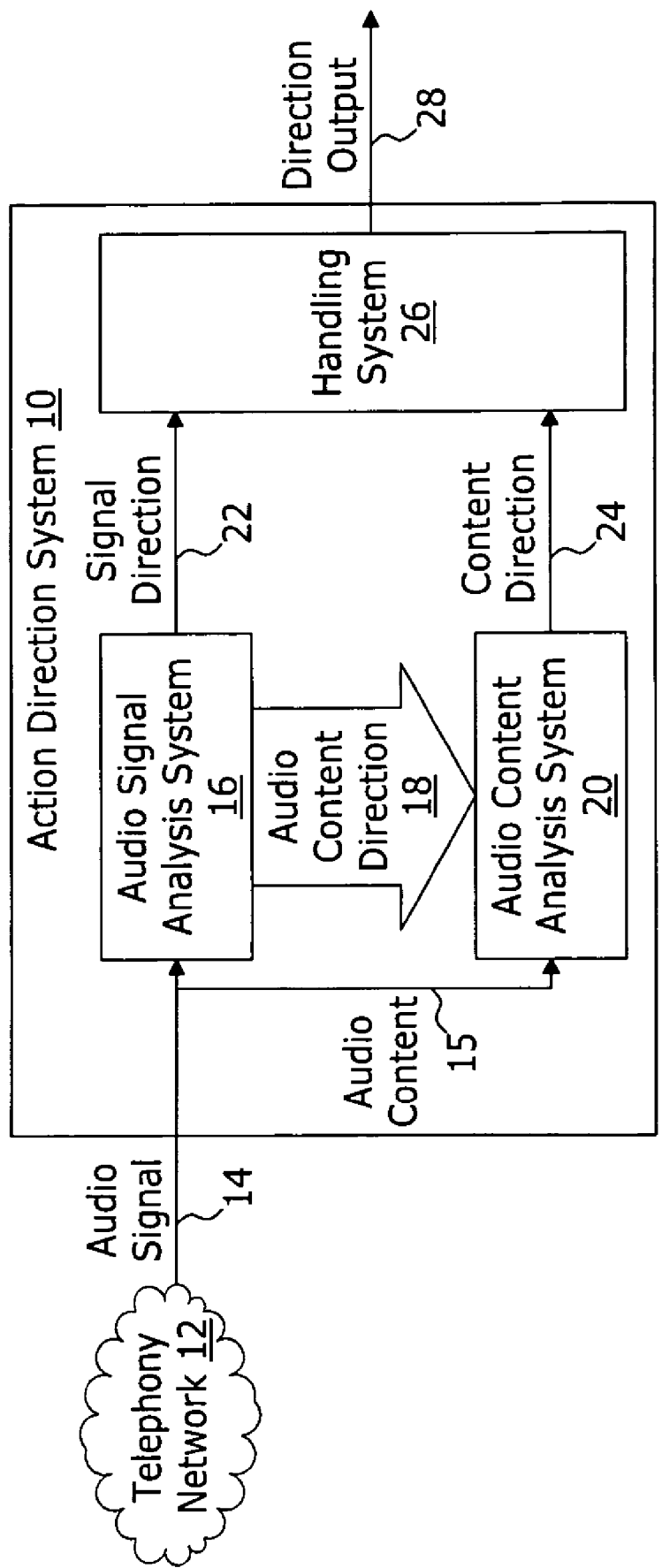
FIG. 1 is a block diagram representing an exemplary architecture for an action direction system for directing action based on analysis of audio content within an audio signal in accordance with one embodiment of the present invention.

The present invention will now be described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should also be appreciated that many of the elements discussed in this specification may be implemented in a hardware circuit(s), a processor executing software code, or a combination of a hardware circuit(s) and a processor or control block of an integrated circuit executing machine readable code. As such, the term circuit, module, server, or other equivalent description of an element as used throughout this specification is intended to encompass a hardware circuit (whether discrete elements or an integrated circuit block), a processor or control block executing code, or a combination of a hardware circuit(s) and a processor and/or control block executing code.

FIG. 1 represents an overview of an action direction system 10 for directing action based on analyzing an audio content portion of an audio signal 14 (e.g audio content 15) received in response to placing an outbound call. The action direction system 10 receives an audio signal 14 from the telephony network 12 in response to placement of an outbound call—typically placed by an automated dialing system.

The action direction system 10 may comprise an audio signal analysis system 16, an audio content analysis system 20, and a handling system 26. It should be appreciated that the grouping of functions performed by each of the audio signal analysis system 16, the audio content analysis system 20, and the handling system 26 is for purposes of facilitating teaching of the present invention herein and those skilled in the art will recognize that in any embedded system the grouping of functions is a matter of design choice.

In general, the audio signal analysis system 16 uses known systems to analyze the audio signal 14 to distinguish between portions of the audio signal 14 which represent i) in-band signaling such as binary ring cadence and binary busy cadence; ii) an off-hook transition click; iii) audio below a silence threshold; and iv) audio content.

Audio content 15 comprises a portion of the audio signal 14, other than in-band signaling, with a varying intensity and frequency above a silence threshold which, when converted to acoustic sound, has significance to a person, typically linguistic significance (such as spoken words) or musical significance (such as sung words and/or musical instruments).

A signal direction 22 provides a signal direction to the handling system 26 identifying each such portion of the audio signal 14 and may provide an audio content direction 18 to the audio content analysis system 20 identifying the portion(s) of the audio signal 14 representing audio content 15. Alternatively, in an implementation of the present invention wherein the audio signal 14 is not directly available to the audio content analysis system 20, the audio content direction 18 (identifying of the portion(s) of the audio signal representing audio content) may itself contain the audio content 15 or the portion of the audio signal 14 representing the audio content 15.

The audio content analysis system 20 receives the portions of the audio signal 14 comprising audio content 15 and directs handling of the outbound call by detecting a characteristic of the audio content 15 and providing a content direction 24 identifying the characteristic (or associated characteristic) of the audio content 15 to the handling system 26.

The audio content analysis system 20 may comprise known digital signal processing systems, narrow band filters, and pattern matching algorithms for identifying and distinguishing between characteristics of the audio content.

For example, turning to the table of FIG. 2, various characteristics 42 and their associated characteristic 44 are shown. One example of a characteristic 42 includes repetitive measure (characteristic 42a) such as musical rhythm or beat detected within the intensity pattern and frequency spectrum (e.g. the intensity/frequency spectrum) of the portion of the audio signal 14 representing audio content 15. The associated characteristic 44 associated with a repetitive measure 42a is recorded content 44a because, within the context of answering a telephone call, music is typically modulated onto the phone line audio signal 14 by a machine that plays a recording such as an answering machine, voice mail, or a ring back content server. Music is rarely performed live at the answering of a telephone.

Another example of a characteristic 42 includes an extraneous intensity/frequency spectrum (characteristic 42b). Human speech typically has a recognizable intensity and frequency spectrum (e.g. S.S.I.F.S or speech shaped intensity/frequency spectrums). Audio content with an intensity and/or frequency spectrum that is outside of the speech shaped intensity/frequency spectrum and above a hiss threshold is, for purposes of this application, referred to as an extraneous intensity/frequency spectrum pattern. The associated characteristic 44 associated with an extraneous intensity/frequency spectrum 42b is recorded content 44a because, within the context of answering a telephone call, audio content other than audio content dominated by human speech is typically modulated onto the phone line by a machine that plays a recording such as an answering machine, voice mail, or a ring back content server. One example of extraneous intensity/frequency may include laughter or applause within a recording of a spoken performance such as that of a comedian.

Another example of a characteristic 42 includes a speech shaped intensity/frequency spectrum—lasting for an extended duration (on the order of two seconds or more) from its start (e.g. a continuous speech shaped intensity/frequency spectrum 42c of an extended duration). The associated characteristic 44 associated with continuous speech shaped intensity/frequency spectrum 42c of an extended duration is recorded content 44a because in the context of answering a telephone, human speech that continues without a pause for a return greeting of 350 ms to 2,000 ms is typically associated with a pre-recorded announcement rather than a human making a greeting and pausing for a return greeting (e.g. a return greeting pause).

Another example of a characteristic 42 includes a speech shaped intensity/frequency spectrum—with a repetitive pattern (e.g. a repetitive speech shaped intensity/frequency spectrum 42d). The associated characteristic 44 associated with repetitive speech shaped intensity/frequency spectrum 42d is real time spoken audio 44b because, within the context of answering a telephone, human speech that repeats one or more words (with a return greeting pause there between) is a characteristic of a human speaking a greeting, expecting a response, and repeating the greeting if no response is forth coming.

Another example of a characteristic 42 includes a discontinuity 42e in the intensity/frequency spectrum. The associated characteristic 44 associated with discontinuity 42e in the intensity/frequency spectrum is an answer event 44c because, within the context of answering a telephone, a discontinuity 42e is a characteristic of the change in audio content associated with a human "taking over" from machine generated audio content such as when a person answers the telephone in the middle of an answering machine greeting or answers the telephone in the middle of audio content ring back.

Returning to FIG. 1, the handling system 26 receives the signal direction 22 from the audio signal analysis system 16 and receives the content direction 24 from the audio content analysis system 20 and directs handling of the outbound call in response thereto by generating a direction output 28.

Turning to FIG. 3, a table representing exemplary handling in response to an event parameter 46 (e.g. various permutations of the signal direction 22 and the content direction 24) is shown.

In one example of an event parameter 46a, the presence of binary busy cadence within the audio signal 14 is associated with direction output 28a to handle the present status of the outbound call as unanswered and busy.

In another example of an event parameter 46b, the presence of audio content 15 within the audio signal 14 with a characteristic 42 associated with recorded content 44a (both of FIG. 2) before the existence of binary ring back cadence within the audio signal 14 can be interpreted as audio content ring back and the direction output 28b is a direction to maintain a ring back state (e.g. handle the present status of the outbound call as in a ring back state).

In another example of an event parameter 46c, the presence of binary ring back cadence within the audio signal 14 followed by audio content 15 within the audio signal 14 with a characteristic 42 associated with recorded content 44a (both of FIG. 2) can be interpreted as recorded audio content from an answering machine or voice mail server and the direction output 28c is a direction to handle the present status of the outbound call as answered by a machine.

In another example of an event parameter 46d, the presence of an off-hook transition click within the audio signal 14 followed by audio content 15 within the audio signal 14 with a characteristic 42 associated with recorded content 44a (both of FIG. 2) can be interpreted as recorded audio content from an answering machine or voice mail and the direction output 28c is a direction to handle the present status of the outbound call as answered by a machine.

In another example of an event parameter 46e, the presence of audio content 15 within the audio signal 14 with a characteristic 42 associated with real time spoken audio 44b (both of FIG. 2) can be interpreted as human speech and the direction output 28d is a direction to handle the present status of the outbound call as answered by a person.

In another example of an event parameter 46f, the presence of audio content 15 within the audio signal 14 (which may be ambiguous as to whether recorded content of real time spoken audio), followed by audio below a silence threshold lasting between 350 ms and 2,000 ms, followed by audio content 15 (again, which may be ambiguous as to whether recorded content of real time spoken audio) which, in the aggregate represents a repetitive speech shaped intensity/frequency spectrum (42d of FIG. 2) can be interpreted as human speech and the direction output 28d is a direction to handle the present status of the outbound all as answered by a person.

Figure 4:
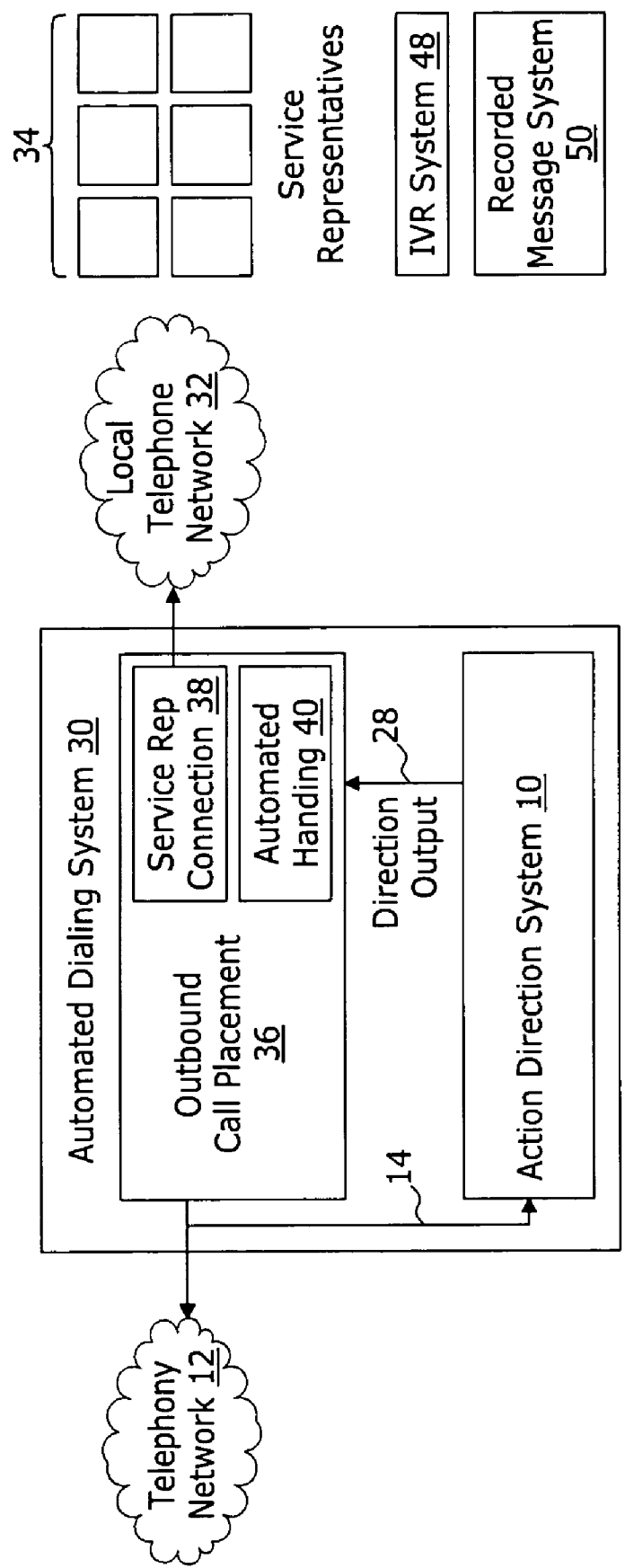
FIG. 4 is a block diagram representing exemplary implementation of a system for direction action based on analysis of audio content in an automated dialing system.

The block diagram of FIG. 4 represents an exemplary implementation of the action direction system 10 within an automated dialing system 30. The automated dialing system 30 couples to the telephone network 12 for placing outbound calls. The automated dialing system 30 may also be coupled to any of an interactive voice response (IVR) system 48, a recorded message system 50, and a local telephone network 32 for handling of the outbound calls once answered. In this example, an outbound call, after being answered, may be coupled to the IVR system 42 for automated interaction with the called party, coupled to the recorded message system 44 for playing a message to the called party, or coupled to a service representative 34 over the local telephone network 32 for service representative interaction with the called party.

The automated dialing system 30 comprises an outbound call placement system 36 and the action direction system 10. The outbound call placement system 36 comprises an automated handling system 40 and a service representative connection system 38. Upon placing an outbound call in accordance with traditional automated dialing technology, the audio signal is coupled to the action direction system 10 which, in turn, provides a direction output signal 28 to the automated handling system 40. If and when the direction output signal 28 indicates that the outbound call is in an answered by a person state: i) the automated handling system 40 may couple the outbound call to the IVR system 48 or the recorded message system 50; or ii) the service representative connection system 38 may couple the outbound call to a service representative 34.

In summary, systems and methods of the present invention provide for: i) distinguishing audio received in response to placing an outbound call by analyzing audio content within an audio signal (as opposed to detecting discontinuities in the audio signal) and taking one of a plurality of actions based on a characteristic of the audio signal; ii) detecting when an outbound telephone call has been answered in response to placing an outbound call that does not rely on detecting traditional ring back cadence; iii) detecting whether an outbound telephone call has been answered in a network lacking traditional ring back cadence; and iv) if answered, whether such outbound call has been answered by a person or an answering machine.

Although the invention has been shown and described with respect to certain exemplary embodiments, it is obvious that equivalents and modifications will occur to others skilled in the art upon the reading and understanding of the specification. The present invention includes all such equivalents and modifications, and is limited only by the scope of the following claims.

What is claimed is:

1. An action direction system for directing action based on distinguishing audio content received in response to placing an outbound call, the action direction system comprising:
   an audio signal analysis system directing a portion of an audio signal that comprises audio content to an audio content analysis system; and
   the audio content analysis system:
   receiving portions of the audio signal comprising audio content; and
   directing handling of the outbound call in response to detecting a characteristic of the audio content that is interpreted as audio content ring back.

2. The system of claim 1, wherein the audio content analysis system:
   directs a first handling of the outbound call in response to identifying a first characteristic of the audio content; and
   directs a second handling of the outbound call in response to identifying a second characteristic of the audio content.

3. The system of claim 2, wherein:
   the first handling of the outbound call is directed in response to identifying a characteristic of the audio content associated with recorded audio content; and
   the second handling of the outbound call is directed in response to identifying a characteristic of the audio content associated with real time spoken audio.

4. The system of claim 3, wherein the characteristic of the audio content that is associated with recorded audio content is a repetitive measure.

5. The system of claim 3, wherein the characteristic of the audio content that is associated with recorded audio content is an extraneous intensity/frequency spectrum pattern.

6. The system of claim 1, further comprising a handling action system directing handling of the outbound call in response to a combination of:
   a signal direction provided by the audio signal analysis system, the signal direction identifying a portion of the audio signal representing one of a plurality of audio events from a group of audio events consisting of: i) binary ring cadence; ii) binary busy cadence; iii) an "off hook" transition click; iv) audio below a silence threshold; and v) audio content; and
   a content direction provided by the audio content analysis system, the content direction identifying a characteristic of the audio content.

7. The system of claim 6, wherein the handling action system:
   directs a first handling of the outbound call in response to the content direction identifying a first characteristic of the audio content; and
   directs a second handling of the outbound call in response to the content identify a second characteristic of the audio content.

8. The system of claim 6, wherein the handling action system:
   directs handling of the outbound call as unanswered in a ring back state in response to identifying a characteristic of the audio content associated with recorded content before the audio signal analysis system identifies a portion of the audio signal consisting of binary ring cadence;
   directs handling of the outbound call as answered by a messaging machine in response to identifying a characteristic of the audio content associated with recorded content after the audio signal analysis system identifies a portion of the audio signal consisting of one of binary ring cadence and an "off hook" transition click; and
   directs handling of the outbound call as answered by a person in response to identifying a characteristic of the audio content associated with real time spoken audio.

9. The system of claim 8, wherein the characteristic of the audio content that is associated with recorded audio content is a repetitive measure.

10. The system of claim 8, wherein the characteristic of the audio content that is associated with recorded audio content is an extraneous intensity/frequency spectrum pattern.

11. The system of claim 1, further comprising a handling system for directing handling of the outbound call to maintain a ring back state in response to detecting a characteristic of the audio content that is interpreted as audio content ring back.

12. The system of claim 1, the audio signal analysis system detecting the portion of the audio signal that comprises audio content.

13. A system for detecting audio content ring back in response to placing an outbound call, the system comprising:

an audio signal analysis system directing the portion of an audio signal that comprises audio content to an audio content analysis system in response to detecting such audio content before detecting a portion of an audio signal that comprises binary ring back cadence; and the audio content analysis system:

receiving portions of the audio signal comprising audio content; and identifying the portion of the audio signal comprising audio content as audio content ring back if a characteristic of the audio content is associated with recorded audio content.

14. The system of claim 13, wherein the characteristic of the audio content that is associated with recorded audio content is a repetitive measure.

15. The system of claim 13, wherein the characteristic of the audio content that is associated with recorded audio content is an extraneous intensity/frequency spectrum pattern.

16. The system of claim 13, the audio signal analysis system detecting the portion of the audio signal that comprises audio content.

17. A method for directing handling of an outbound telephone call based on distinguishing audio content in an audio signal received in response to placing the outbound call, the method comprising:

identifying a portion of the audio signal representing one of a plurality of audio events from a group of audio events consisting of: i) binary ring cadence; ii) binary busy cadence; iii) an "off hook" transition click; iv) audio below a silence threshold; and v) audio content;

directing a portion of an audio signal that comprises audio content to an audio content analysis system;

analyzing the audio content and generating a content direction identifying a characteristic of the audio content;

directing handling of the outbound call based on a combination of both a sequence of events and the characteristic of the audio content, wherein the characteristic of the audio content is interpreted as audio content ring back.

18. The method of claim 17, wherein the step of directing handling of the outbound call based on a combination of both a sequence of events and the characteristic of the audio content comprises:

directing a first handling of the outbound call in response to identifying a first characteristic of the audio content; and directing a second handling of the outbound call in response to identifying a second characteristic of the audio content.

19. The method of claim 18, wherein:

the first handling of the outbound call is directed in response to identifying a characteristic of the audio content associated with recorded audio content; and the second handling of the outbound call is directed in response to identifying a characteristic of the audio content associated with real time spoken audio.

20. The method of claim 19, where the characteristic of the audio content that is associated with recorded audio content is a repetitive measure.

21. The method of claim 19, where the characteristic of the audio content that is associated with recorded audio content is an extraneous intensity/frequency spectrum pattern.

22. The method of claim 17, wherein the directing handling of the outbound call comprises maintaining a ring back state when a characteristic of the audio content is interpreted as audio content ring back.

23. The method of claim 17, further comprising detecting a portion of the audio signal that comprises audio content.

* * * * *